(12) United States Patent
Weykamp et al.

(10) Patent No.: US 10,835,942 B2
(45) Date of Patent: Nov. 17, 2020

(54) WARM FORMING PROCESS AND APPARATUS FOR TRANSVERSE BENDING OF AN EXTRUDED ALUMINUM BEAM TO WARM FORM A VEHICLE STRUCTURAL COMPONENT

(71) Applicant: Shape Corp., Grand Haven, MI (US)

(72) Inventors: Helen Weykamp, Grand Haven, MI (US); Kenneth E. McKellar, Jenison, MI (US); David DeVries, Grand Haven, MI (US)

(73) Assignee: Shape Corp., Grand Haven, MI (US)

( * ) Notice: Subject to any disclaimer, the term of this patent is extended or adjusted under 35 U.S.C. 154(b) by 168 days.

(21) Appl. No.: 15/686,837

(22) Filed: Aug. 25, 2017

(65) Prior Publication Data

US 2018/0056352 A1   Mar. 1, 2018

Related U.S. Application Data

(60) Provisional application No. 62/380,053, filed on Aug. 26, 2016.

(51) Int. Cl.
*B21C 23/08* (2006.01)
*B21D 7/06* (2006.01)
*B21D 53/88* (2006.01)
*B21C 23/00* (2006.01)
(Continued)

(52) U.S. Cl.
CPC .......... *B21C 23/085* (2013.01); *B21C 23/002* (2013.01); *B21D 7/06* (2013.01); *B21D 53/88* (2013.01); *C22F 1/04* (2013.01); *B21D 7/16* (2013.01)

(58) Field of Classification Search
None
See application file for complete search history.

(56) References Cited

U.S. PATENT DOCUMENTS

| 4,082,578 A | * | 4/1978 | Evancho | C22F 1/05 148/535 |
|---|---|---|---|---|
| 5,383,986 A | | 1/1995 | Cho | |
| 5,393,357 A | | 2/1995 | Cho | |

(Continued)

FOREIGN PATENT DOCUMENTS

| AU | 2003244695 A1 | 10/2003 |
|---|---|---|
| BR | PI0915440 A2 | 11/2015 |

(Continued)

OTHER PUBLICATIONS

G.W. Kuhlman, Forging of Aluminum Alloys, 2005, ASM Handbook, vol. 14A: Metalworking: Bulk Forming (Year: 2005).*

(Continued)

*Primary Examiner* — Colleen P Dunn
*Assistant Examiner* — Michael J Kachmarik
(74) *Attorney, Agent, or Firm* — Honigman LLP

(57) ABSTRACT

A method for warm forming an aluminum beam, such as an aluminum component for a vehicle, includes providing an extruded aluminum beam with a hollow cross-sectional shape. A portion of a forming die is heated to a desired temperature, so as to heat a portion of the aluminum beam in the die to a temperature below the artificial aging temperature of the aluminum beam. The heated aluminum beam is deformed to a desired shape with the die in a direction transverse to a length of the aluminum beam.

16 Claims, 15 Drawing Sheets

(51) Int. Cl.
*C22F 1/04* (2006.01)
*B21D 7/16* (2006.01)

(56) References Cited

U.S. PATENT DOCUMENTS

| | | | |
|---|---|---|---|
| 5,439,536 A | 8/1995 | Cho | |
| 5,560,789 A | 10/1996 | Sainfort et al. | |
| 6,027,582 A | 2/2000 | Shahani et al. | |
| 6,315,842 B1 | 11/2001 | Shahani et al. | |
| 6,349,521 B1 | 2/2002 | McKeon et al. | |
| 6,528,183 B2 | 3/2003 | Dif et al. | |
| 6,685,782 B1 | 2/2004 | Schwellinger | |
| 6,692,589 B2 | 2/2004 | Warner et al. | |
| 6,869,490 B2 | 3/2005 | Cho | |
| 7,125,459 B2 | 10/2006 | Cho | |
| 7,135,077 B2 | 11/2006 | Warner | |
| 7,211,161 B2 | 5/2007 | Pillet et al. | |
| 7,229,509 B2 | 6/2007 | Cho | |
| 7,252,723 B2 | 8/2007 | Dif et al. | |
| 7,452,429 B2 | 11/2008 | Boselli et al. | |
| 7,520,945 B2 | 4/2009 | Dumont et al. | |
| 7,550,110 B2 | 6/2009 | Warner et al. | |
| 7,704,333 B2 | 4/2010 | Cho et al. | |
| 7,744,704 B2 | 6/2010 | Bes et al. | |
| 7,763,128 B2 | 7/2010 | Heymes et al. | |
| 7,776,167 B2 | 8/2010 | Catteau et al. | |
| 7,780,802 B2 | 8/2010 | Dif et al. | |
| 7,837,808 B2 | 11/2010 | Heymes et al. | |
| 7,841,507 B2 | 11/2010 | Kempa et al. | |
| 7,862,903 B2 | 1/2011 | Eberl et al. | |
| 7,901,522 B2 | 3/2011 | Hollrigl et al. | |
| 7,938,165 B2 | 5/2011 | Lequeu et al. | |
| 7,993,474 B2 | 8/2011 | Warner et al. | |
| 8,211,251 B2 | 7/2012 | Carsley et al. | |
| 8,277,580 B2 | 10/2012 | Dangerfield et al. | |
| 8,323,425 B2 | 12/2012 | Wang et al. | |
| 8,323,426 B2 | 12/2012 | Danielou et al. | |
| 8,420,226 B2 | 4/2013 | Ehrstrom et al. | |
| 8,469,255 B2 | 6/2013 | Bordesoules et al. | |
| 8,690,207 B2 | 4/2014 | Gaisne et al. | |
| 8,771,441 B2 | 7/2014 | Bes et al. | |
| 8,814,187 B2 * | 8/2014 | Pedersen | B60G 7/001 |
| | | | 280/124.134 |
| 9,381,880 B2 | 7/2016 | Matecki et al. | |
| 9,555,504 B2 | 1/2017 | Bordesoules-Eberl et al. | |
| 9,945,010 B2 | 4/2018 | Danielou et al. | |
| 10,065,266 B2 | 9/2018 | Glazebrook et al. | |
| 10,144,998 B2 | 12/2018 | Lequeu et al. | |
| 2001/0006082 A1 | 7/2001 | Warner et al. | |
| 2002/0011289 A1 | 1/2002 | Warner | |
| 2002/0031682 A1 | 3/2002 | Dif et al. | |
| 2002/0134474 A1 | 9/2002 | Cho | |
| 2003/0207141 A1 | 11/2003 | Warner et al. | |
| 2003/0219353 A1 | 11/2003 | Warner et al. | |
| 2004/0003872 A1 | 1/2004 | Pillet et al. | |
| 2004/0079455 A1 | 4/2004 | Dif et al. | |
| 2004/0182483 A1 | 9/2004 | Heymes et al. | |
| 2005/0006008 A1 | 1/2005 | Cho | |
| 2005/0034794 A1 | 2/2005 | Benedictus et al. | |
| 2005/0058568 A1 | 3/2005 | Boselli et al. | |
| 2005/0084408 A1 | 4/2005 | Cho et al. | |
| 2005/0150578 A1 | 7/2005 | Bes et al. | |
| 2005/0167016 A1 | 8/2005 | Dumont et al. | |
| 2005/0183802 A1 | 8/2005 | Catteau et al. | |
| 2005/0186302 A1 | 8/2005 | Sohn et al. | |
| 2005/0189044 A1 | 9/2005 | Benedictus et al. | |
| 2005/0189048 A1 | 9/2005 | Cho | |
| 2006/0000094 A1 | 1/2006 | Garesche et al. | |
| 2006/0016523 A1 | 1/2006 | Dif et al. | |
| 2006/0054666 A1 | 3/2006 | Ehrstrom et al. | |
| 2006/0118213 A1 | 6/2006 | Eberl et al. | |
| 2006/0151075 A1 | 7/2006 | Van Der Veen et al. | |
| 2006/0191609 A1 | 8/2006 | Dangerfield et al. | |
| 2007/0131313 A1 | 6/2007 | Cho et al. | |
| 2007/0181229 A1 | 8/2007 | Bes et al. | |
| 2007/0194603 A1 | 8/2007 | Bouet-Griffon et al. | |
| 2007/0246137 A1 | 10/2007 | Lequeu et al. | |
| 2007/0259200 A1 | 11/2007 | Lequeu et al. | |
| 2008/0056932 A1 | 3/2008 | Cho et al. | |
| 2008/0210350 A1 | 9/2008 | Warner et al. | |
| 2008/0223492 A1 | 9/2008 | Catteau et al. | |
| 2008/0236708 A1 | 10/2008 | Heymes et al. | |
| 2008/0289728 A1 | 11/2008 | Bes | |
| 2009/0223608 A1 | 9/2009 | Hollrigl et al. | |
| 2010/0001133 A1 | 1/2010 | Kempa et al. | |
| 2010/0288400 A1 | 11/2010 | Bordesoules et al. | |
| 2010/0314007 A1 | 12/2010 | Danielou et al. | |
| 2011/0209801 A2 | 9/2011 | Warner et al. | |
| 2011/0278397 A1 | 11/2011 | Bes et al. | |
| 2012/0018422 A1 | 1/2012 | Bohner et al. | |
| 2012/0138195 A1 | 6/2012 | Philbrook et al. | |
| 2012/0152415 A1 | 6/2012 | Danielou et al. | |
| 2012/0261036 A1 | 10/2012 | Pouget et al. | |
| 2012/0291925 A1 | 11/2012 | Bes et al. | |
| 2012/0325381 A1 | 12/2012 | Gasqueres et al. | |
| 2013/0009422 A1 | 1/2013 | Bouet-Griffon et al. | |
| 2013/0092294 A1 | 4/2013 | Eberl et al. | |
| 2013/0248053 A1 | 9/2013 | Bordesoules-Eberl et al. | |
| 2013/0269840 A1 | 10/2013 | Danielou et al. | |
| 2014/0220381 A1 | 8/2014 | Muller et al. | |
| 2014/0283958 A1 | 9/2014 | Bes et al. | |
| 2015/0129370 A1 | 5/2015 | Shahani et al. | |
| 2015/0255253 A1 | 9/2015 | Van Kappel et al. | |
| 2015/0299837 A1 | 10/2015 | Ehrstrom et al. | |
| 2015/0376742 A1 | 12/2015 | Matsumoto et al. | |
| 2016/0053357 A1 | 2/2016 | Bes et al. | |
| 2016/0060741 A1 | 3/2016 | Chevy et al. | |
| 2016/0144946 A1 | 5/2016 | Danielou et al. | |
| 2016/0237531 A1 | 8/2016 | Bes | |
| 2016/0237532 A1 | 8/2016 | Danielou et al. | |
| 2016/0304994 A1 | 10/2016 | Skubich et al. | |
| 2016/0304995 A1 | 10/2016 | Sigli et al. | |
| 2016/0355916 A1 | 12/2016 | Danielou et al. | |
| 2016/0368588 A1 | 12/2016 | Pignatel et al. | |
| 2016/0368589 A1 | 12/2016 | Bayona-Carrillo | |
| 2017/0050264 A1 | 2/2017 | Glazebrook et al. | |
| 2017/0106429 A1 * | 4/2017 | Nakanishi | B60R 19/18 |
| 2017/0218487 A1 | 8/2017 | Franklin et al. | |
| 2017/0218493 A1 | 8/2017 | Pouget et al. | |
| 2017/0292180 A1 | 10/2017 | Pouget et al. | |
| 2017/0306454 A1 | 10/2017 | Chevy et al. | |
| 2017/0314113 A1 | 11/2017 | Skubich et al. | |
| 2018/0171449 A1 | 6/2018 | Skubich et al. | |
| 2018/0179621 A1 | 6/2018 | Muller et al. | |
| 2018/0202026 A1 | 7/2018 | Dolega et al. | |
| 2018/0258517 A1 | 9/2018 | Franklin et al. | |
| 2018/0282849 A1 * | 10/2018 | Tundal | B21C 23/002 |
| 2018/0297098 A1 * | 10/2018 | Kerr | B21D 22/025 |

FOREIGN PATENT DOCUMENTS

| | | |
|---|---|---|
| BR | 112015032476 A2 | 7/2017 |
| BR | PI1010800 A2 | 7/2017 |
| BR | 112018003521 A2 | 9/2018 |
| CA | 2730028 A1 | 1/2010 |
| CA | 2760015 A1 | 11/2010 |
| CA | 2507820 C | 9/2011 |
| CA | 2916525 A1 | 12/2014 |
| CA | 2923109 A1 | 4/2015 |
| CA | 2941193 A1 | 9/2015 |
| CA | 2997667 A1 | 3/2017 |
| CA | 3001252 A1 | 4/2017 |
| CN | 101076613 A | 11/2007 |
| CN | 102112263 A | 6/2011 |
| CN | 102421563 A | 4/2012 |
| CN | 105339125 A | 2/2016 |
| CN | 108136730 A | 6/2018 |
| CN | 106170573 B | 12/2018 |
| EP | 1567685 A2 | 8/2005 |
| EP | 1158068 B1 | 4/2009 |
| EP | 2429752 A1 | 3/2012 |
| EP | 1544315 B1 | 8/2012 |
| EP | 2664687 B1 | 7/2015 |
| EP | 1838891 B1 | 12/2015 |

(56) References Cited

FOREIGN PATENT DOCUMENTS

| | | | |
|---|---|---|---|
| EP | 2049696 B1 | 3/2016 | |
| EP | 3013514 A2 | 5/2016 | |
| EP | 3052669 A1 | 8/2016 | |
| EP | 3114245 A1 | 1/2017 | |
| EP | 2318171 B1 | 9/2017 | |
| EP | 3362282 A1 | 8/2018 | |
| EP | 2652163 B1 | 9/2018 | |
| EP | 3080317 B1 | 9/2018 | |
| EP | 3394305 A1 | 10/2018 | |
| FR | 2879217 A1 | 6/2006 | |
| FR | 2945464 A1 | 11/2010 | |
| FR | 3011252 A1 | 4/2015 | |
| JP | 2004189063 A | 7/2004 | |
| JP | 2006509107 A | 3/2006 | |
| KR | 20070015962 A | * | 2/2007 |
| KR | 20070015962 A | 2/2007 | |
| KR | 20080103300 A | 11/2008 | |
| KR | 20150030118 A | 3/2015 | |
| KR | 20160077244 A | 7/2016 | |
| RU | 2674789 C1 | 1/2018 | |
| WO | WO-2004053180 A2 | 6/2004 | |
| WO | WO-2006064113 A1 | 6/2006 | |
| WO | WO-2010003595 A1 | 1/2010 | |
| WO | WO-2010130887 A1 | 11/2010 | |
| WO | WO-2014207564 A2 | 12/2014 | |
| WO | WO-2015044538 A1 | 4/2015 | |
| WO | 2015112799 A1 | 7/2015 | |
| WO | WO-2015131992 A1 | 9/2015 | |
| WO | WO-2017044471 A1 | 3/2017 | |
| WO | WO-2017064396 A1 | 4/2017 | |
| WO | WO-2019007817 A1 | 1/2019 | |

OTHER PUBLICATIONS

Machine Translation of KR 2007/0015962, 2007 (Year: 2007).*
Taylan Altan, R&D Update: Forming aluminum alloys at elevated temperatures, Part 1, stamping journal, published Jun. 11, 2015 (Year: 2015).*
Bolt, Feasibility of warm drawing of aluminum products, journal of materials processing technology 115, published 2001 (Year: 2001).*
Donald Askeland, The Science and Engineering of Materials, PWS publishing company, copyright 1984 (Year: 1984).*
A. K. Dahle, Aluminum Alloys, Heat Treatment of, Elsevier Science Ltd, copyright 2001, (Year: 2001).*
Hyunok Kim and Taylan Altan, Warm Forming of Aluminum Alloys, Powerpoint, Oct. 15, 2014, pp. 1-25, EWI Forming Center, Ohio, United States of America.
Lincoln Electric, Common Design Mistakes in Aluminum, Webpage, United States, Oct. 24, 2017, http://www.lincolnelectric.com/en-us/support/welding-how-to/Pages/aluminum-design-mistakes-details.aspx.
Frank Armao, Aluminum Workshop: Weldable and unweldable aluminum alloys, online publication, May 11, 2011, Practical Welding Today, United States, http://www.thefabricator.com/article/aluminumwelding/weldable-and-unweldable-aluminum-alloys.
Lincoln Electric, Aluminum Welding Frequently Asked Questions, Webpage, United States, Oct. 24, 2017, http://www.lincolnelectric.com/en-us/support/welding-solutions/Pages/aluminum-faqs-detail.aspx.
The Aluminum Association, Rolling Aluminum: From the Mine Through the Mill, Publication, 2007, pp. 1-135, Third Edition, United States.
International Searching Authority, International Search Report and Written Opinion for Application No. PCT/IB2017/055141, dated Jul. 5, 2018.
European Patent Office, Extended European Search Report for EP Application No. 17843046.8, dated Apr. 21, 2020.

* cited by examiner

| NO HEAT APPLIED | | |
| --- | --- | --- |
| TEST # | HOURS AGED | CRACK? (Y/N) |
| 1 | 1.25 | N |
| 2 | 4.25 | N |
| 3 | 6.5 | N |
| 4 | 23.5 | Y |
| 5 | 27.25 | N |
| 6 | 30.5 | Y |
| 7 | 46.5 | Y |
| 8 | 51.25 | Y |
| 9 | 54 | Y |

FIG. 14A

| HEAT APPLIED | | |
| --- | --- | --- |
| TEST # | HOURS AGED | CRACK? (Y/N) |
| 1 | 3.5 | N |
| 2 | 72 | N |
| 3 | 144 | N |
| 4 | 240 | N |
| 5 | 384 | Y |
| 6 | 408 | N |
| 7 | 552 | Y |
| 8 | 744 | Y |

FIG. 14B

WARM FORMING PROCESS AND APPARATUS FOR TRANSVERSE BENDING OF AN EXTRUDED ALUMINUM BEAM TO WARM FORM A VEHICLE STRUCTURAL COMPONENT

CROSS-REFERENCE TO RELATED APPLICATION

This application claims benefit and priority under 35 U.S.C. § 119(e) of U.S. provisional application Ser. No. 62/380,053, filed Aug. 26, 2016, which is hereby incorporated herein by reference in its entirety.

FIELD OF THE INVENTION

The present invention generally relates to forming machinery and processes used for warm forming aluminum alloys, and more particularly to warm forming processes for forming vehicle components with high strength aluminum alloys.

BACKGROUND OF THE INVENTION

It is generally known that aluminum alloys have low formability and ductility compared to steel and other metals, such that ductility and formability of aluminum is desirably increased prior to forming, especially if significant time, such as several days, has passed since an aluminum piece has been extruded. Traditionally, prior to forming an aluminum alloy component from an extruded aluminum blank, the aluminum blank required a solution treatment, which involves heating the aluminum blank to elevated temperatures without melting and then quenching the hot blank to around room temperature. Thus, after the solution treatment or normalizing has taken place, the blank would need to be formed within approximately one or two days of quenching the component to prevent the effects of natural aging, such as increased hardness and reduced ductility, from rendering the formability of the blank generally undesirable for cold forming operations.

SUMMARY OF THE PRESENT INVENTION

The present invention provides an apparatus and method for warm forming a high-strength, extruded aluminum beam, such as to provide an aluminum structural component for a vehicle. The extruded aluminum beam may be formed from 6000 or 7000 series aluminum alloy and the beam may have a hollow cross-sectional shape, which can be desired for particular vehicle structural applications or assemblies, such as a bumper beam or the like. A portion of a die may be heated to a desired temperature before or after loading the beam into the die. At least a portion of the aluminum beam may be heated in the die to a temperature near or below the artificial aging temperature of the aluminum beam. The heated portion of the aluminum beam may then be deformed to a desired shape with the die in a direction transverse to a length of the aluminum beam. As a result of the warm forming, this deformation to the aluminum beam is generally done without causing cracking or other bending failure to the beam, which may otherwise be expected for such a high-strength aluminum alloy. Accordingly, the warm forming process provided herein allows an extruded beam to be formed to a desired shape outside of a time frame after extrusion or solutionizing that would typically cause the extruded beam to crack or otherwise fail as a result of such a deformation. Thus, a solutionizing process can be avoided while also improving manufacturing cycle time and inventory management of extruded aluminum pieces or blanks.

According to one aspect of the present invention, an aluminum structural component for a vehicle body structure includes a tubular beam, such that a cross-sectional shape taken transverse to a length of the tubular beam has an enclosed interior area extending along the length of the tubular beam. The tubular beam may be extruded from one of a 6000 and a 7000 series aluminum alloy. A longitudinal section of the tubular beam includes a depression that is pressed into a side wall of the tubular beam to protrude into the enclosed interior area at a desired shape, such as transverse to the length of the tubular beam at a depth that is configured to receive a vehicle accessory. The depression may be formed with a heated portion of a die that is pressed into the side wall at the desired longitudinal section of the tubular beam, such that the heated die has a temperature that prevents cracking at or near the desired longitudinal section.

According to another aspect of the present invention, a method for warm forming an aluminum beam may include extruding an aluminum beam with a hollow cross-sectional shape. A portion of a die is heated to a desired temperature, such that at least a portion of the aluminum beam is heated in the die to a temperature below the artificial aging temperature of the aluminum beam. The heated aluminum beam is deformed to a desired shape with the die in a direction transverse to a length of the aluminum beam. Optionally, the die may deform the cross-sectional shape of the aluminum beam in at least one of an outward direction and an inward direction at the heated portion of the aluminum beam. Also, the aluminum beam may have a curvature, such as for a bumper reinforcement beam, formed along at least a section of the length of the aluminum beam to define a convex outer wall, such that, upon heating the die and a section of the aluminum beam, a depression may formed into the convex outer wall without cracking at or near the depression.

According to yet another aspect of the present invention, a method for warm forming an aluminum beam includes providing an extruded aluminum beam that is extruded from one of a 6000 series and a 7000 series aluminum alloy. A portion of a die is heated to a desired temperature, such that the extruded aluminum beam is heated in the die to a desired temperature. The heated portion of the aluminum beam may then be deformed to a desired shape with the die in a direction transverse to a length of the aluminum beam. Optionally, the aluminum beam may be naturally aged at room temperature, such as for approximately 24 hours, prior to deforming the desired shape into the aluminum beam, such as to allow sufficient time for storage and/or transportation of the extruded beam after extruding or heat treating the beam.

According to another aspect of the present invention, an apparatus for warm forming a 6000 series or 7000 series aluminum beam may include a press station that has a die configured to form an extruded aluminum beam into a desired shape. The die may be configured to deform a depression into the aluminum beam in a direction transverse to a length of the aluminum beam. A heating element may be coupled with a portion of the die and may be configured to heat the die for conductively heating at least a portion of the aluminum beam to a desired temperature below the artificial aging temperature of the aluminum beam prior to forming the depression.

These and other objects, advantages, purposes, and features of the present invention will become apparent upon review of the following specification in conjunction with the drawings.

BRIEF DESCRIPTION OF THE DRAWINGS

FIG. 14A is a table showing test results of crushing a 5.6 mm deformation into a hollow extruded aluminum beam without warm forming, along with the corresponding instances of cracking that correlate with the time of natural aging;

FIG. 14B is a table showing test results of crushing a 5.6 mm deformation into a hollow extruded aluminum beam with warm forming, along with the corresponding instances of cracking that correlate with the time of natural aging.

DETAILED DESCRIPTION OF EMBODIMENTS

Figure 1:
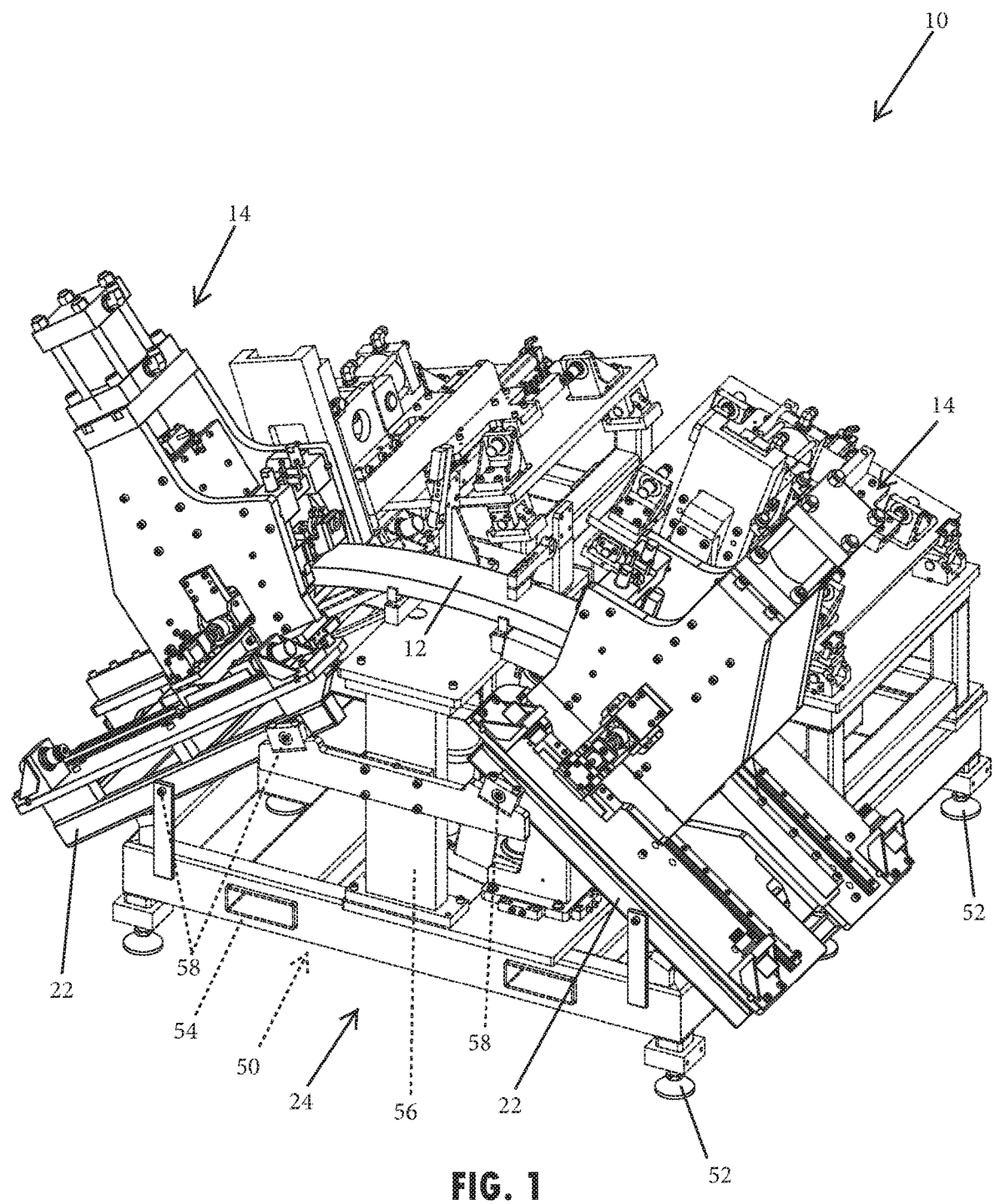
FIG. 1 is an upper perspective view of a stretch bending machine having die presses disposed at end sections of the formed beam that are configured to perform a warm forming process on the beam, in accordance with an embodiment of the present invention.

Referring now to the drawings and the illustrative embodiments depicted therein, an apparatus and method are provided for warm forming an extruded aluminum beam, such as to form a structural component for a vehicle, such as a bumper reinforcement beam. The method may include extruding an aluminum beam from a high-strength aluminum alloy, such as a 6000 or 7000 series aluminum alloy, to provide the beam with a generally consistent profile or cross-sectional geometry along the length of the beam that is desirable for forming the resulting structural component with the beam. The beam may include a hollow cross-sectional shape, which can be desirable for particular applications or assemblies, such as a vehicle bumper assembly or an energy absorbing or impact management structure or another automotive structural component. It is understood that the warm forming processes disclosed herein may be utilized for extruded aluminum beams of various shapes, types, and applications.

As provided herein, to form the desired structural component with the extruded aluminum beam, a warm forming process may be utilized to plastically deform the beam to provide a desired shape for the particular application of the beam, such as to form a depression into a longitudinal section of the extruded beam at a depth that is configured to receive a vehicle accessory or otherwise meet other structural and/or design demands of the vehicle component. The warm forming may deform the cross-sectional shape of the aluminum beam inward and/or outward at the heated portion of the aluminum beam to provide the desired component shape. As a result of the warm forming, the deformation to the aluminum beam may be done without causing cracking or other bending failure to an aluminum beam that has undergone natural aging. Accordingly, the warm forming process of this method allows the extruded beam to be deformed to a desired shape outside of a time frame after extrusion or solutionizing that would typically cause the extruded beam to crack or otherwise fail as a result of such a deformation. Thus, a solutionizing process can be avoided while also improving manufacturing cycle time and inventory management of extruded pieces or blanks.

Further, after extruding or solutionizing the aluminum beam, it may undergo naturally aging in storage, transportation, and/or in process to move toward secondary processing, such as transverse bending and deformation. Accordingly, the natural aging may occur at approximately room temperature, which may generally be above 32 degrees Fahrenheit and generally below 100 degrees Fahrenheit. When using the warm forming process disclosed herein, the natural aging of the high strength aluminum beam may occur for approximately or substantially more than 24 hours prior to deforming the desired shape into the aluminum beam.

Figure 2:
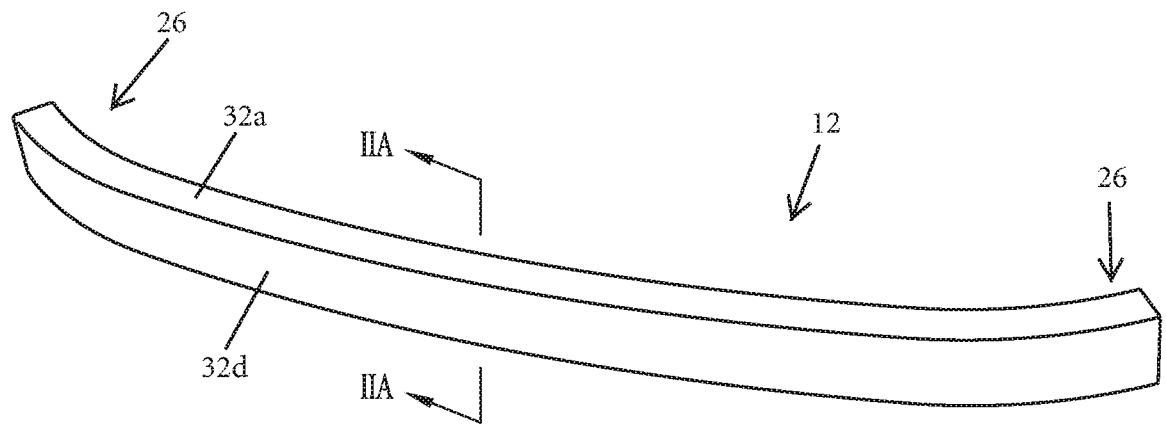
FIG. 2 is a perspective view of an extruded aluminum beam with curved end sections.

For example, as provided by the test results illustrated in the table shown in FIG. 14A, when no heat was applied during a forming process of a high strength aluminum beam similar to that shown in FIG. 2, and thus the warm forming process was not used, the aluminum beam began to crack during forming after or around 24 hours of natural aging at room temperature. Specifically, as shown in FIG. 14A, the results started to show cracking at around 23.5 hours of recorded natural aging from the solutionizing or extrusion of the beam. The deformation during this test was the result of at about 7 mm of compression in a die press, where thickness of the beam was about 50 mm and the die press formed the beam similar to that shown in FIG. 12, at or around an intermediate longitudinal section of the beam. In stark contrast to these results, the test results provided in the table shown in FIG. 14B are the result of a similar deformation process, but when heat was applied to such a high strength aluminum beam, thus applying the warm forming process described herein. In these results shown in FIG. 14B, the beam was able to be naturally aged over 240 hours without experiencing any cracking, and not until around 384 hours of natural aging did the beam experience a crack with the warm forming process. Also, in one recorded case, the beam was naturally aged up to 408 hours prior to the warm forming process without experiencing any cracking during the transverse bending to undergo deformation. Such a significant time extension allowed by this warm forming process provides increased time for storage and/or transportation of the extruded beam after extruding or heat treating the beam, while also providing the option of not requiring additional solutionizing processes after the beam has been extruded.

Figure 8:
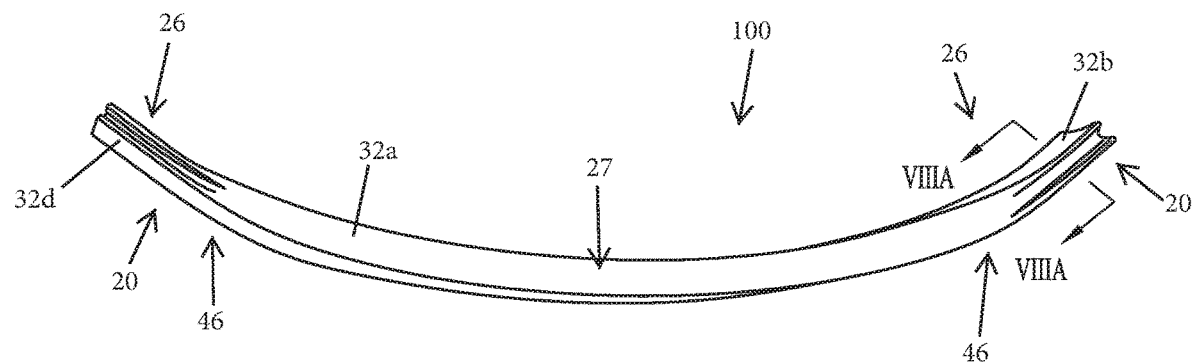
FIG. 8 is a perspective view of the extruded aluminum beam shown in FIG. 2 after the end sections are warm formed by the die presses shown in FIG. 1.

A warm forming apparatus or machine may be embodied in various configurations and arrangements, such as to correspond with the desired structural component or components that will be produced with such a process. To accurately and consistently warm form desired shapes at such heated temperatures, the forming apparatus is configured to control elevated die temperatures, lubrication temperature and amounts, and forming cycle time, among other sensitive variables. As shown in FIG. 1, one embodiment of an apparatus 10 for warm forming a 6000 series or 7000 series aluminum beam 12 may include a press station 14 that has a die 16 with a portion 18 (FIG. 5) configured to form the extruded aluminum beam 12 into the desired shape. The die 16 may be configured to deform or press a depression 20 into the aluminum beam 12 in a direction transverse to a length of the aluminum beam 12 for forming the aluminum structural component 100 (FIG. 8). As illustrated in FIG. 1, the warm forming apparatus 10 includes two press stations 14 arranged at opposing portions or platforms 22 of a stretch bending machine 24, so as to engage and warm form the end portions 26 of the extruded beam 12 (FIG. 2). However, it is understood that a single press or more forming stations may be provided along a beam or aluminum component in additional embodiments of a warm forming apparatus. A heating element 28 may be coupled with the die 16 and may be configured to heat the die 16 for conductively heating at least a portion of the aluminum beam 12 to a desired temperature for warm forming the depression. Accordingly, once the stretch bending machine 24 has formed the desired curvature into the beam 12, if any such curvature is desired, the presses may be used to warm form the end sections of the beam. The energy delivery systems for operating the apparatus may include mechanical, servo, and/or hydraulic presses or the like.

Figure 2A:
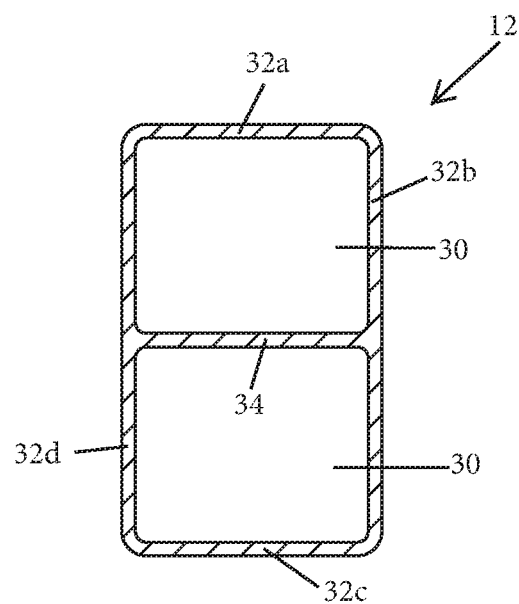
FIG. 2A is a cross-sectional view of the extruded aluminum beam, taken at line IIA-IIA of FIG. 2, showing the cross-sectional shape of the beam.

A shown in FIGS. 2 and 2A, the extruded aluminum beam 12 has been longitudinally deformed from a straight extrusion to provide a curvature along a length of the beam 12, such as via a stretch bending process. The curvature of the beam 12 shown in FIG. 2 varies along its length and is more pronounced at the end sections 26, although it is contemplated that the curvature may be generally consistent along the length of the beam. Also, the beam 12 has been extruded to have a tubular profile, such that a cross-sectional shape taken transverse to a length of the tubular beam 12, as shown in FIG. 2A, has two hollow or enclosed interior areas 30 that extend along the length of the tubular beam 12. Thus, the cross-sectional shape of the beam 12 shown in FIG. 2A includes four exterior walls 32a, 32b, 32c, 32d that are substantially orthogonal relative to each other to provide a generally rectangular shaped outer tube, with a single leg or interior wall 34 that extends linearly across the hollow interior area 30 of the beam to interconnect the opposing side walls 32b, 32d of the beam. The interior wall 34 also is generally orthogonal relative to the interconnected side walls 32b, 32d and extends generally continuously along the length of the tubular beam 12. It is contemplated that additional embodiments of the beam may be extruded with differently shaped profiles, such as to have curved side walls, more or fewer or differently shaped interior walls, and/or outward protruding flanges, among other conceivable shapes.

Figure 3:
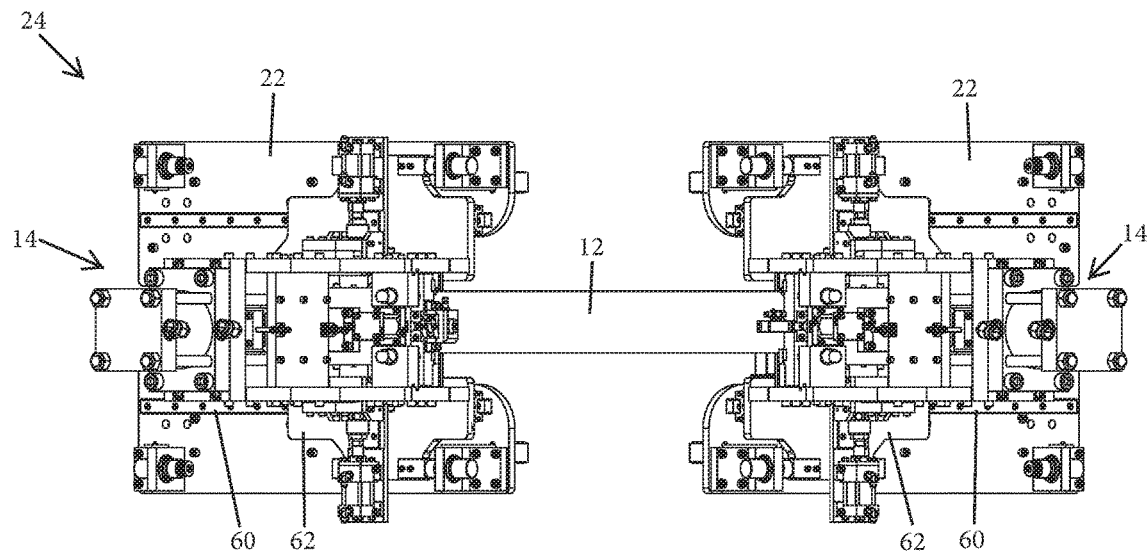
FIG. 3 is a top plan view of the stretch bending machine shown in FIG. 1, showing the die presses and associated supportive structure of the stretch bending machine.
Figure 4:
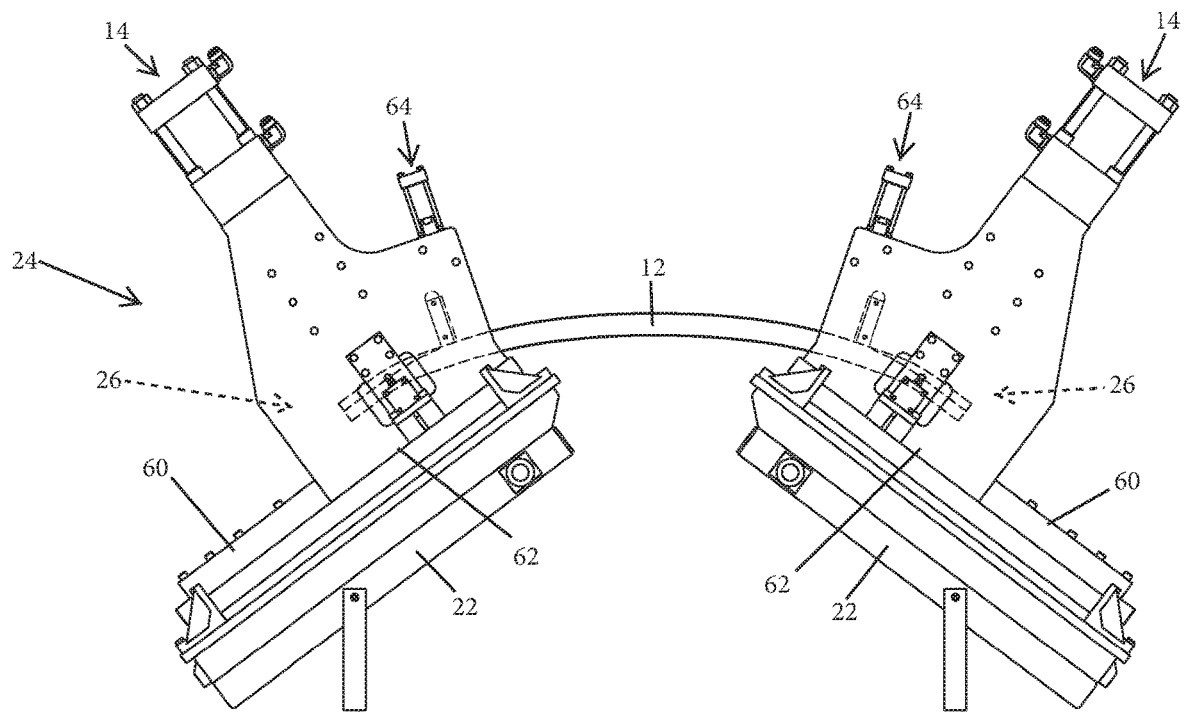
FIG. 4 is a side elevational view of the die presses and associated structure of the stretch bending machine shown in FIG. 3.
Figure 5:
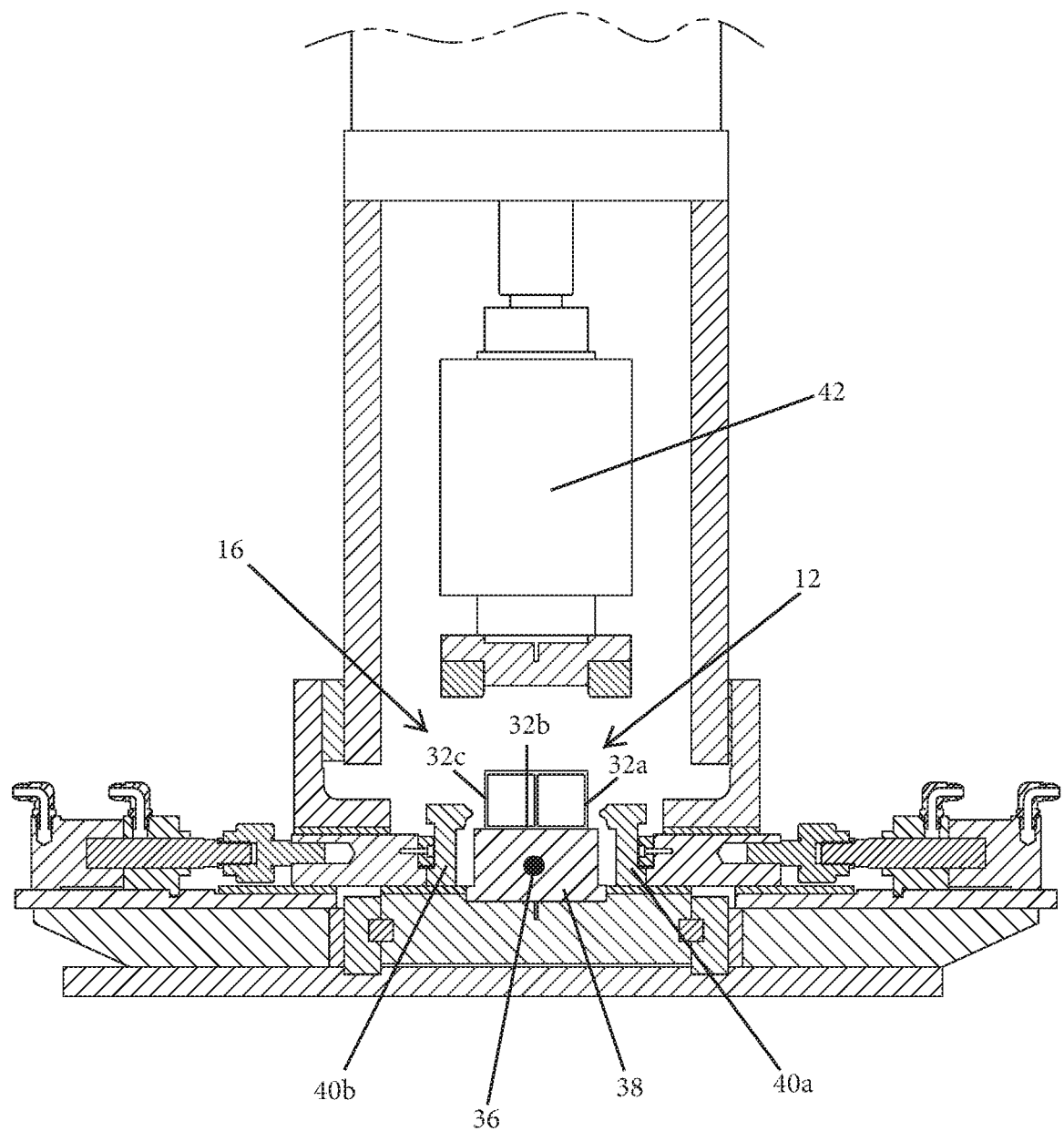
FIG. 5 is a cross-sectional view of one of the die presses of the stretch bending machine in a raised position.

To warm form the end sections 26 of the aluminum beam 12 shown in FIG. 2 to the achieve the desired shape and resulting vehicle component 100 shown in FIG. 8, at least the end sections 26 of the beam 12 are heated in the respective die engaging the end portions, such as shown in FIGS. 3 and 4. Specifically, as shown in FIG. 5, a heating element 36, such as a heating cartridge or the like, may be disposed at a portion of the die 16 to heat a portion of the die to a desired temperature. The heating element 36 is shown disposed in a boring formed in a bed portion 38 that supports the bottom side wall 32b of the beam 12 in the die 16. The heating may be done before or after the beam is loaded into the die, although the illustrated die press may be operated after a stretch bending process, such that it may be preferable to heat the die after the beam has been loaded and the stretch bending process is underway or complete.

Figure 6:
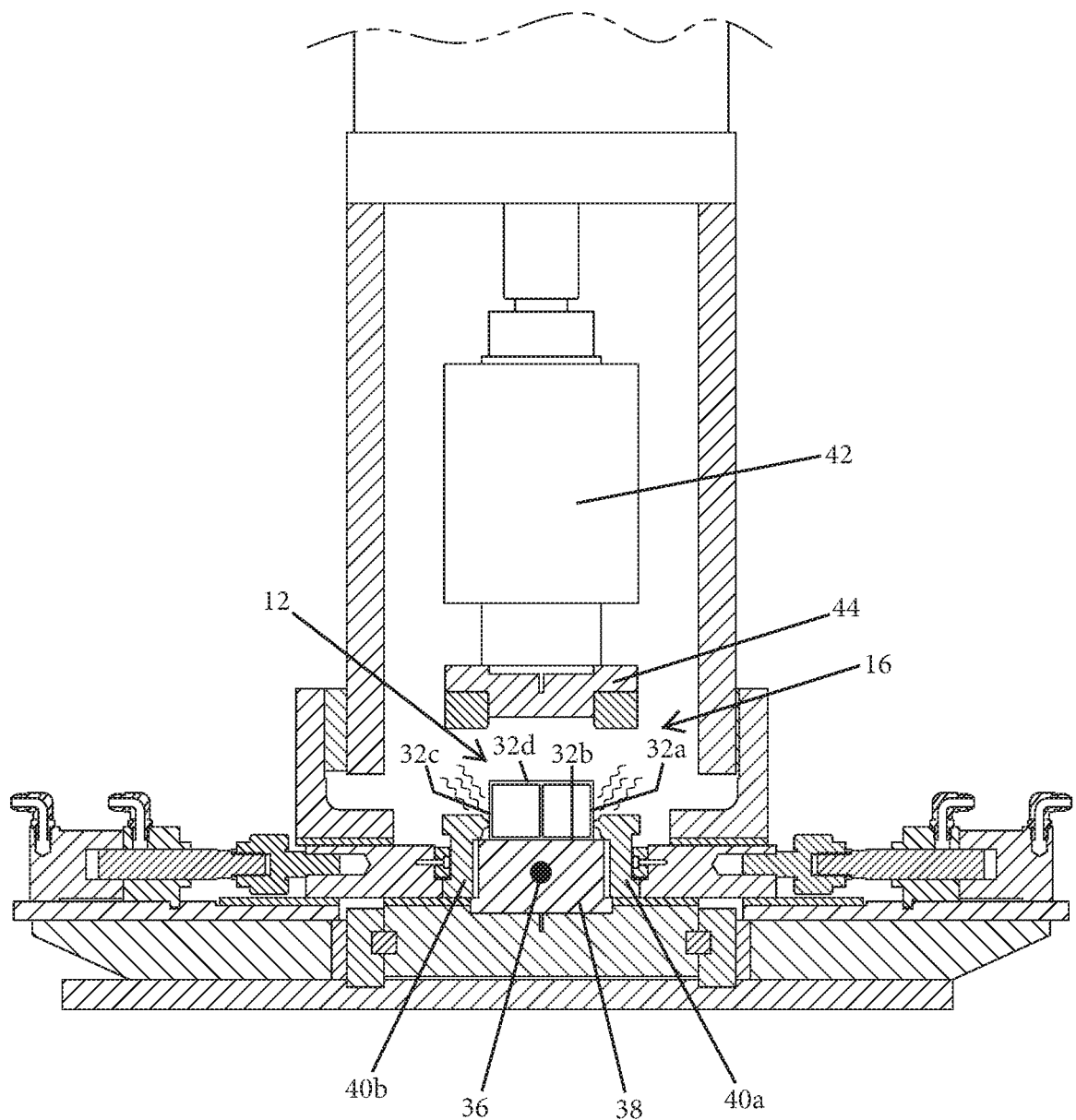
FIG. 6 is a cross-sectional view of the die press shown in FIG. 5, showing the beam being heated with engaged portions of the die press.

Once the die 16 begins to be heated, the portion of the aluminum beam 12 in contact with the die 16 begins to conductively heat due to the conductive nature of aluminum alloys. As shown in FIG. 6, the lateral portions 40a, 40b of the die 16 may be moved laterally inward against the walls 32a, 32c of the beam 12. In doing so, the lateral portions 40a, 40b of the die 16 may engage the heated base portion 38 of the die 16, as shown in FIG. 6, so as to provide a direct conductive pathway to heat the walls 32a, 32c, prior to operably lowering of the press 42. It is also contemplated that more or alternatively configured heating elements may be provided at the die in alternative embodiments, such as at the lateral portions of the die. Preferably, the die is heated to a temperature below the artificial aging temperature of the aluminum beam, which prevents the undesirable result of artificially aging the beam as a consequence of the warm forming process. Thus, the portion or portions of the aluminum beam 12 in contact with the heated portion or portions of the die 16 are preferably heated to a temperature generally between 100 and 300 degrees Fahrenheit or generally a temperature less than 250 degrees Fahrenheit, or preferably to a temperature generally between 200 and 250 degrees Fahrenheit for 7000 series aluminum alloys. The die may generally heat the engaged portion of the aluminum beam and the surrounding portions of the beam to the desired temperature in approximately a few seconds to achieve the desired material properties as a result of the heat to proceed with the deformation step of the warm forming process.

Figure 7:
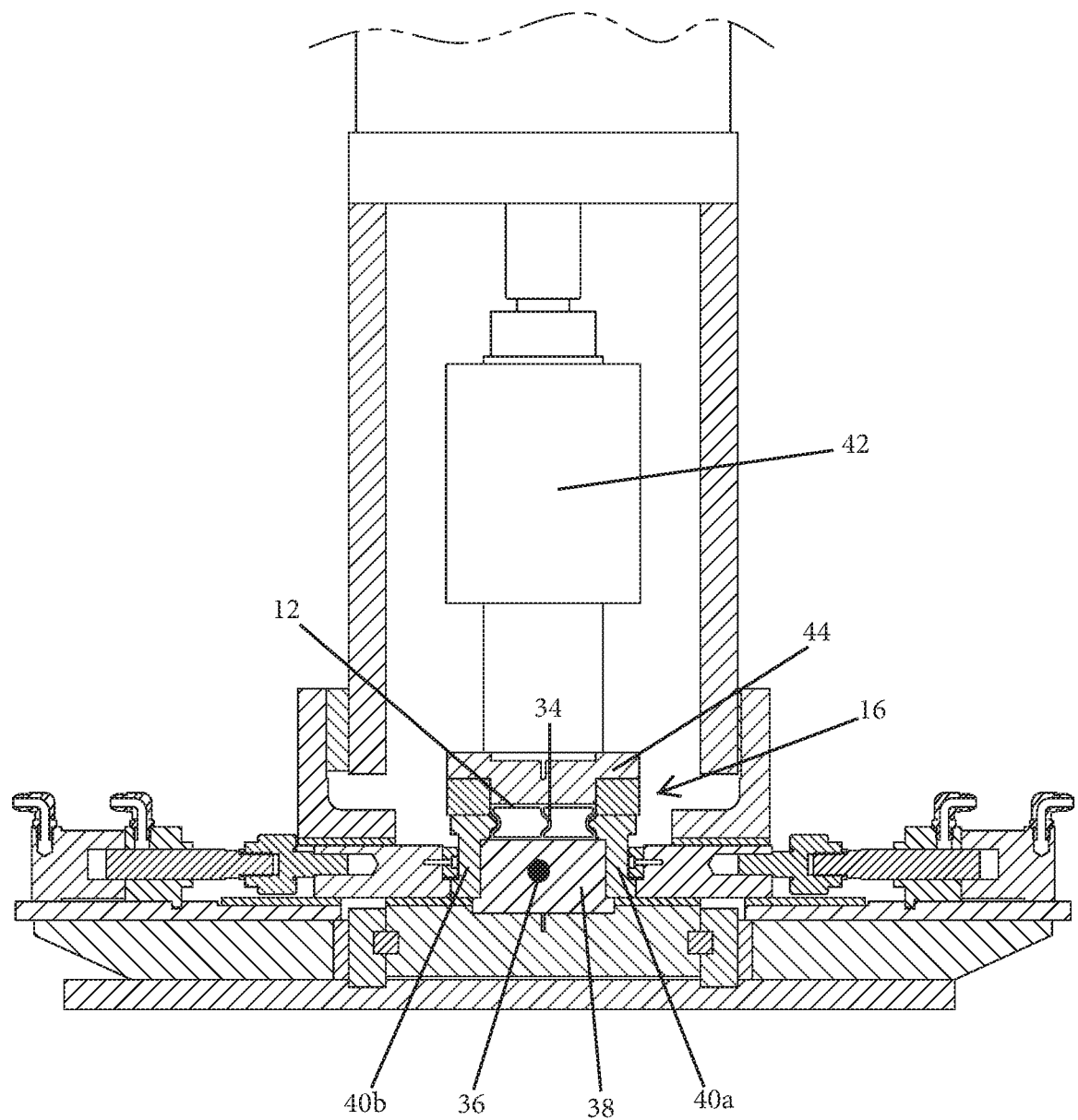
FIG. 7 is a cross-sectional view of the die press shown in FIG. 5 in a lowered position.
Figure 8A:
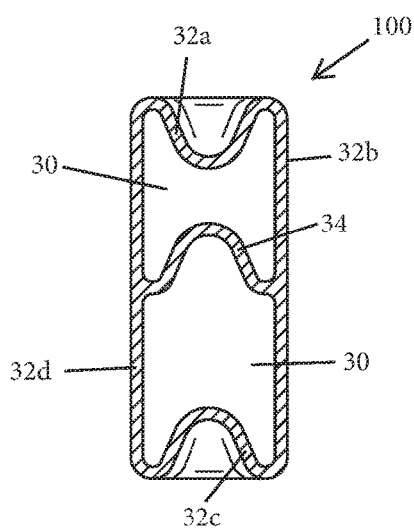
FIG. 8A is a cross-sectional view of the end section of the extruded aluminum beam, taken at line VIIIA-VIIIA of FIG. 8, showing the formed cross-sectional shape of the beam.

As shown in FIG. 7, after or during heating of the beam 12, the heated end section 26 of the aluminum beam 12 is deformed to a desired shape with the die 16 in a direction transverse to the length of the aluminum beam 12. Upon lowering the die press 42 to the lowered position shown in FIG. 7, the upper portion 44 of the die 16 engages the wall 32d of the beam 12 generally consistent across the face of the beam 12, such that the deformation imparted by the press 42 crushes and reduced the width the beam 12 at the end sections 26, as shown in FIG. 8. Thus, the width of the beam at the end sections is reduced to a width that is less than the width of the beam at the central or intermediate section 27 thereof. As a result of this deformation, as shown in FIG. 8A, the center leg or interior wall 34 is deformed or bent to a generally curved, non-linear shape, along with the upper and lower walls 32a, 32c, which are deformed to protrude into the hollow interior areas 30 of the beam 12 as a result of compressing the opposing side walls 32b, 32d closer together. The inward deformation of the opposing side walls 32a, 32c may, at least in part, be caused, respectively, by the lateral portions 40a, 40b engaging the outer surfaces of these walls and providing inward force against these surfaces of the beam 12. Specifically, the lateral portions 40a, 40b of the die 16 may be symmetrically opposite and may include initiators, such as pointed shaped protrusions, that engage the walls of the beam to, at least in part, cause the deformation of the walls to start bending inward. It is contemplated that these initiators may have alternative shapes or arrangements for additional component embodiments or forming apparatus. Thus, the end sections 26 of the beam 12 may be crushed or deformed inward at all the walls of the beam 12, as the opposing walls are pressed inward toward each other, causing the front and rear faces of the component 100 to be bent toward each other at transitional bend points 46 shown in FIG. 8.

The resulting component 100 shown in FIG. 8 thus may be used as a bumper beam, where the end sections 26 provide a desired shape and curvature that generally conforms to an aerodynamic shape of a vehicle bumper or bumper area. Specifically, the end sections 26 of the beam 12 are warm formed to include the deformed and narrowed transverse width, so as to provide packaging space for vehicle assembly components, such as sensors, brackets, and the like. As shown, the aluminum beam 12 has a curvature formed along at least a section of the length of the aluminum beam 12, such that the resulting convex outer wall 32d is under tensile forces that can increase the beams susceptibility to cracking of failure when attempting to deform the beam in a direction generally transverse to it length. Accordingly, it is preferred that the die for such a curved beam 12 be preferably operable to heat along a greater longitudinal extent of the beam from the deformed or depressed area, such as allowing the die to conductively heat along the entire beam, especially when a depression is formed at or into the convex outer wall with the die.

Figure 9:
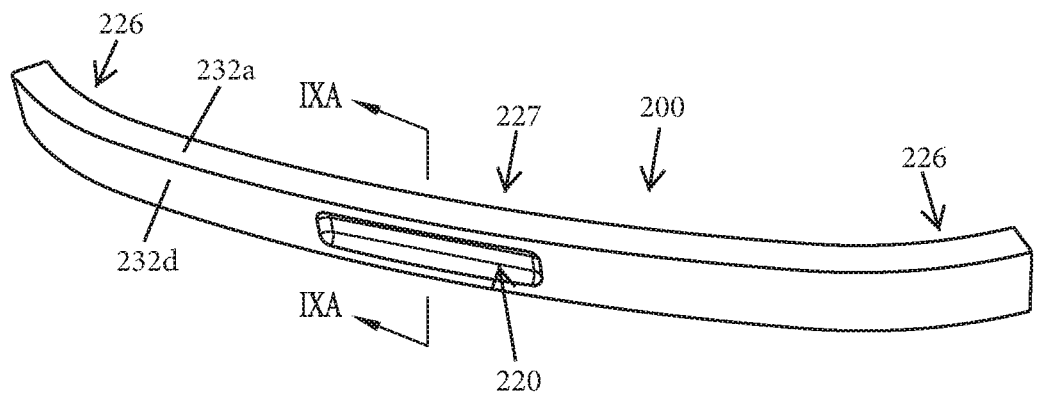
FIG. 9 is a perspective view of an additional embodiment of an extruded aluminum beam after an intermediate longitudinal section is warm formed by a die press.
Figure 9A:
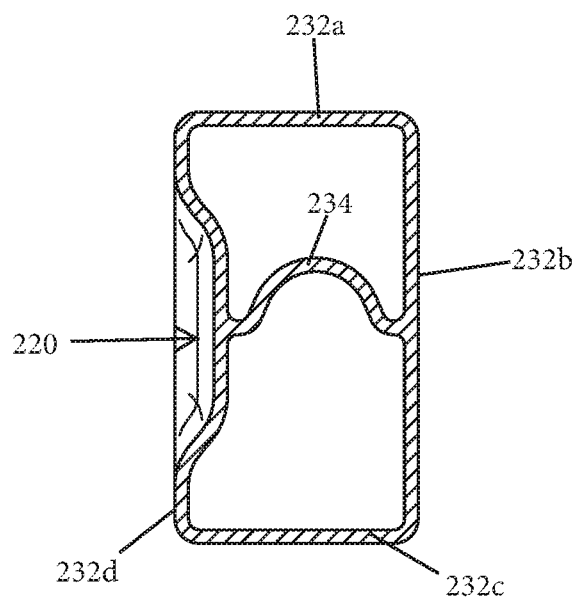
FIG. 9A is a cross-sectional view of the formed section of the extruded aluminum beam, taken at line IXA-IXA of FIG. 9.
Figure 10:
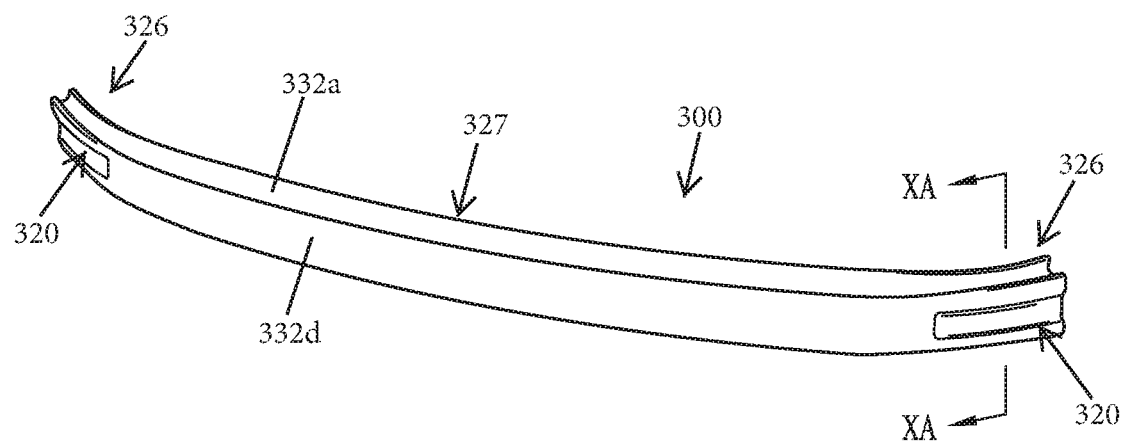
FIG. 10 is a perspective view of an additional embodiment of an extruded aluminum beam after end sections are warm formed by die presses.
Figure 11:
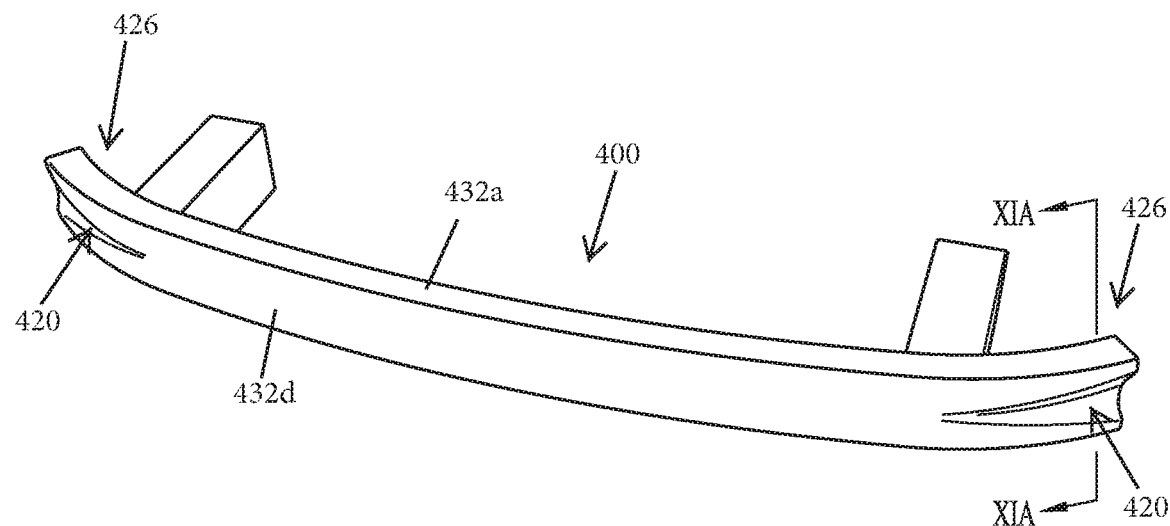
FIG. 11 is a perspective view of an additional embodiment of an extruded aluminum beam after end sections are warm formed by die presses.
Figure 12:
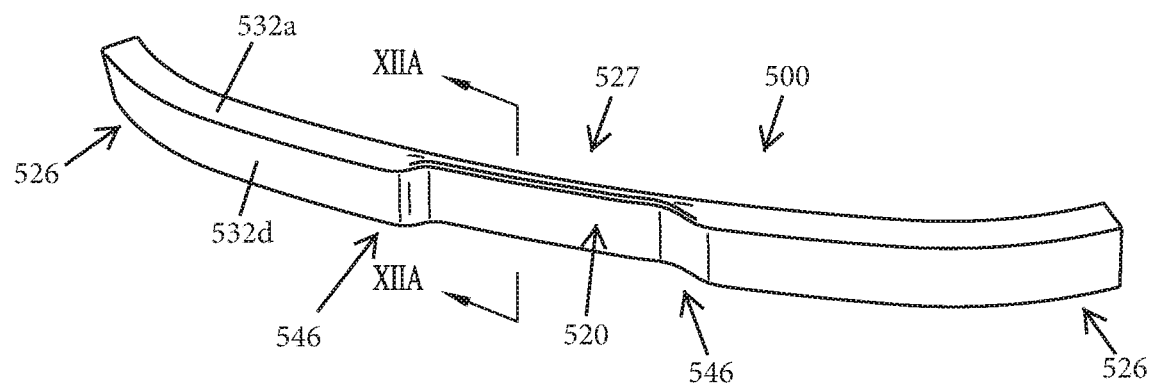
FIG. 12 is a perspective view of an additional embodiment of an extruded aluminum beam after a longitudinal section is warm formed by a die press.
Figure 12A:
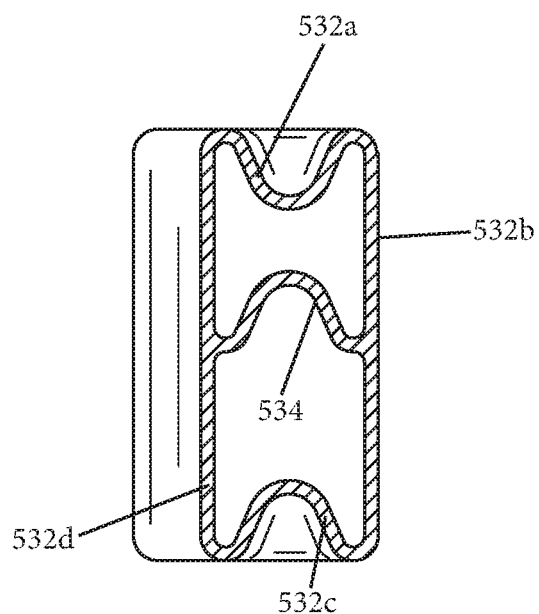
FIG. 12A is a cross-sectional view of the formed section of the extruded aluminum beam, taken at line XIIA-XIIA of FIG. 12.

As shown in FIGS. 9-12A, additional illustrated embodiments of warm formed aluminum structural components are provided with deformed sections of the beam that are shaped or configured to be used for other or additional vehicle accessories, such as license plates or the like. For example, as shown in FIGS. 9 and 9A, the aluminum structural component 200 has a central or intermediate longitudinal section 227 of the tubular beam that is warm formed to have a depression 220 that is pressed inward at a side wall 232d of the tubular beam. This inward depression 220 causes the interior wall 234 to bend and deform within the enclosed interior area to provide the overall desired shape of the component 200. The depression may be formed with a portion of a die that is pressed into the side wall 232d at the desired longitudinal section of the tubular beam, such that the portion of the die that contacts the side wall 232d may be the heated portion of the die that heats at least the intermediate section 227 of the beam to the desired temperature that prevents cracking at or near the desired longitudinal section. Also or alternatively, a heated portion of the die may be disposed at a different location to contact another portion of the beam. Further, the embodiment shown in FIGS. 12 and 12A is a component 500 that also has a deformation 520 at an intermediate longitudinal section 527 of the beam and that is formed into the front wall 532d of the beam at a depth that is configured to receive a vehicle accessory, such as a license plate or the like. Similar to the embodiment shown in FIG. 8, the deformation 520 of the component 500 causes the front and rear faces 532d, 532b of the component 500 to be bent toward each other at transitional bend points 546.

Figure 10A:
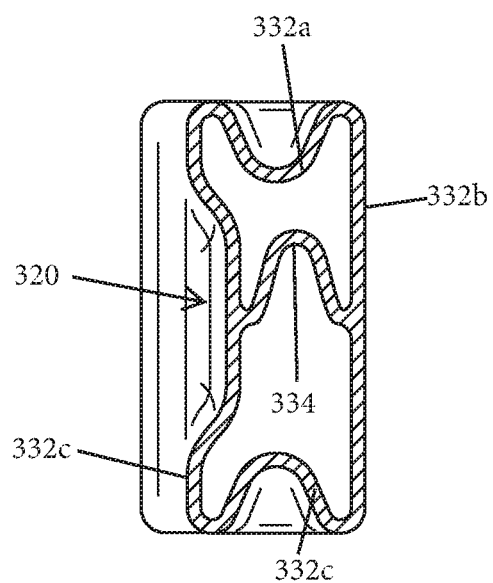
FIG. 10A is a cross-sectional view of one of the formed end sections of the extruded aluminum beam, taken at line XA-XA of FIG. 10.
Figure 11A:
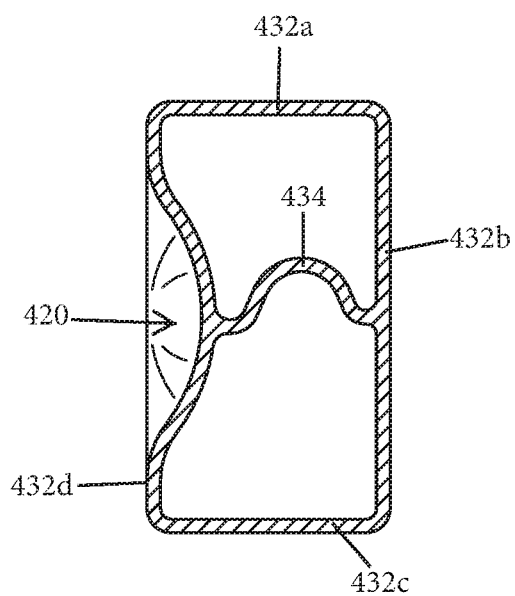
FIG. 11A is a cross-sectional view of one of the formed end sections of the extruded aluminum beam, taken at line XIA-XIA of FIG. 11.

As shown in FIGS. 10 and 10A, the aluminum structural component 300 has end longitudinal sections 326 on opposing sides of the central longitudinal section 327 of the tubular beam that is warm formed to have both an inward depression 320 at the front wall 332d and inward depressions at the upper and lower walls 332a, 332c of beam. Similar to the other embodiments, this inward depression 220 causes the interior wall 334 to bend and deform within the enclosed interior area to provide the overall desired shape of the component 300. The heated portion of the die may be arranged similar to that shown in FIGS. 5-7 and may also or alternatively include a heating element in the portion of the die that contacts the front wall 332d. Further, the embodiment shown in FIGS. 11 and 11A is a component 400 that also has deformations 420 at the end longitudinal sections 426 of the beam, but the deformation shown in the component 400 has a rounded concave curvature formed into the front wall 432d that has an increasing depth and span as the deformation transitions toward the ends of the component 400.

Referring again to the stretch bending machine 24 shown in FIG. 1, it includes a base structure 50 that is supported by feet 52 that are arranged to rest on a floor surface at the corners of the base structure 50. The base structure 50 has a lower portion 54 that extends generally horizontally over the floor to interconnect the feet 52 and an upper portion 56 that protrudes upward near a central area of the base structure 50. The angled platforms 22 of the stretch bending machine 24 are attached to the upper and lower portions 46, 54 of the base structure, such as via the pivotal attachment points 58. Thus, it is contemplated that the platforms 22 may be movably attached at the base structure 50, such as to allow for angular movement of the platforms 22 relative to each other and the base structure 50 during a stretch bending operation of an engaged beam 12. Such angular movement of the platforms 22 may be operated by a hydraulic system that pivots or rotates the platforms 22 about the base structure 50 directly or via a linkage system or the like.

Figure 4A:
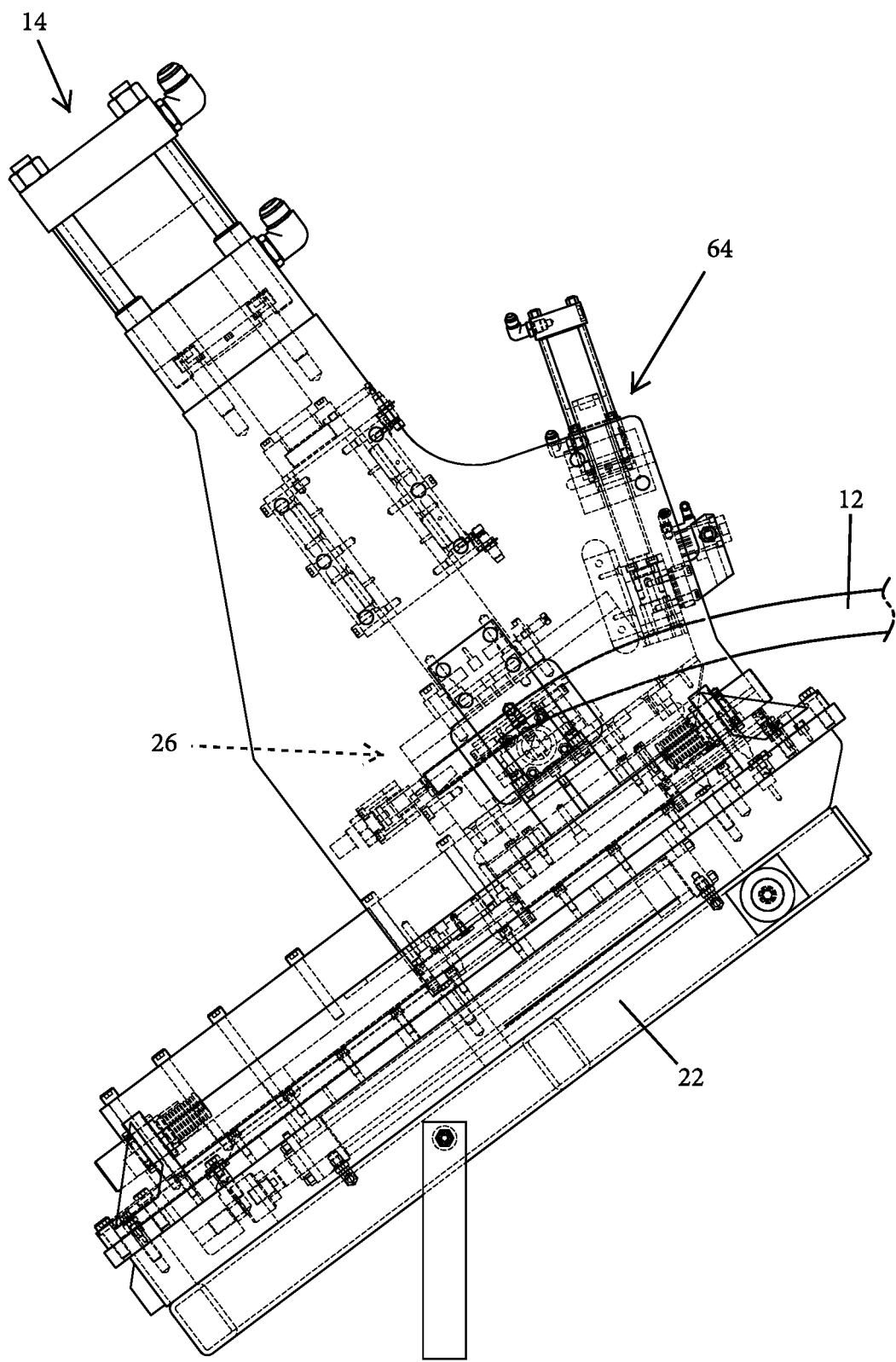
FIG. 4A is a side elevational view of one of the die presses of the stretch bending machine shown in FIG. 4, shown internal components thereof in dashed lines.

With further reference to stretch bending machine 24, such as shown in FIGS. 3 and 4, the platforms 22 may have longitudinal tracks 60 or other linear movement devices arranged at an upper surface of the platform. The illustrated tracks 60 are engaged by a carriage 62 that supports the die presses 14 and a gripper device 64 (FIG. 4A). Thus, to stretch bend the beam 12 from a generally linear shape to a longitudinally curved shape, the beam 12 may be loaded into the stretch bending machine 24 to secure the ends portions 26 of the beam 12 at the opposing platforms 22, such as by clamping or engaging the end portions 26 of the beam 12 with the gripping devices 64 secured to each platform 22. Once the ends portions 26 of the beam are secured, the platforms 22 may pivot away from each other to cause a front face or wall 32d of beam 12 to be placed under tension to bend and form a longitudinal curvature along the entire beam or at a desired section or sections of the beam, such as defined by a shape of a portion of a die that may act as a fulcrum and be disposed below the rear surface or wall 32a of the beam 12. This same process could be replicated in a pressing operation using tooling to support the equipment, such as in a stamping operation.

Figure 13:
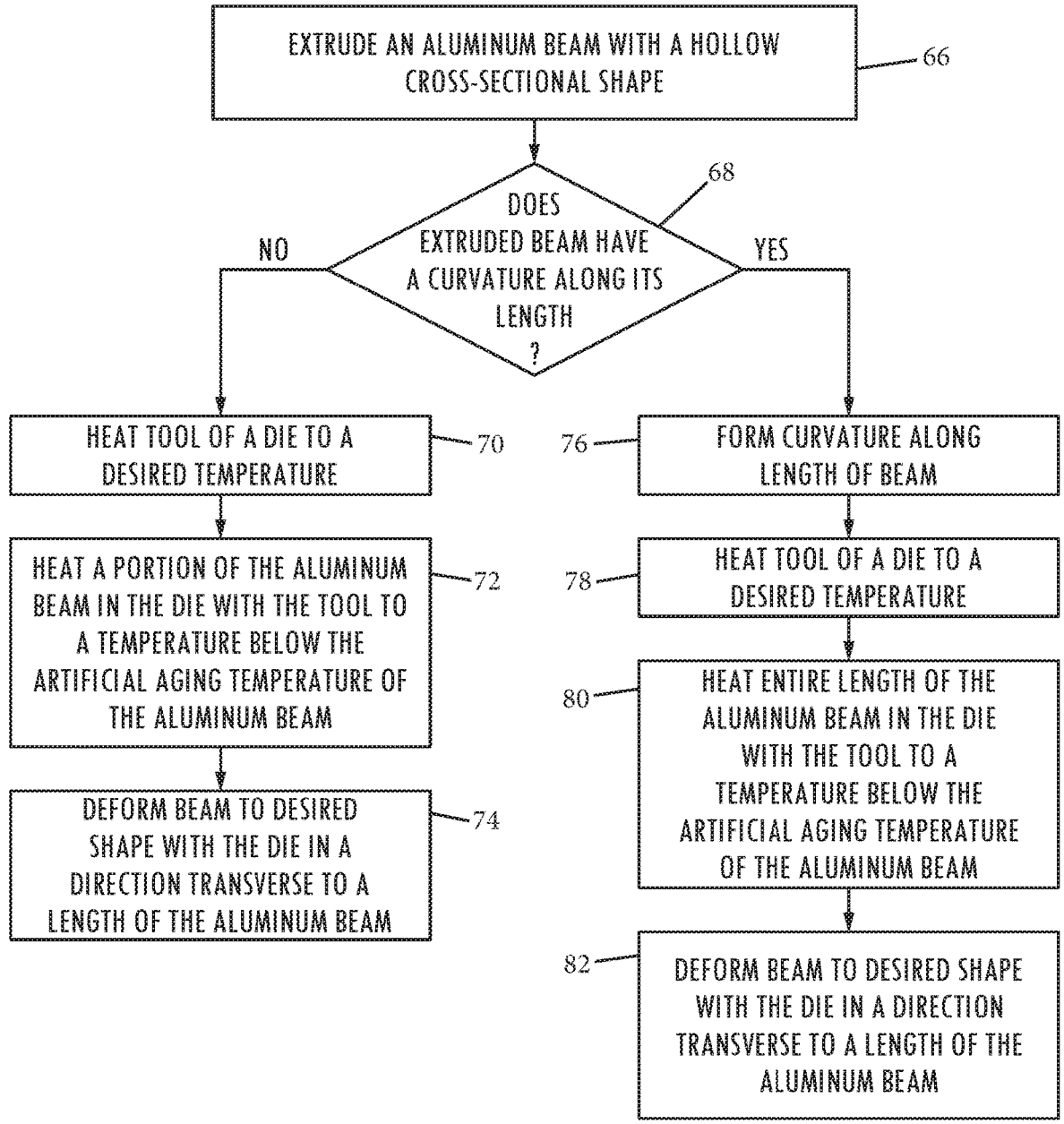
FIG. 13 is a flow chart showing a warm forming process in accordance with one embodiment of the present invention.
Figure 15:
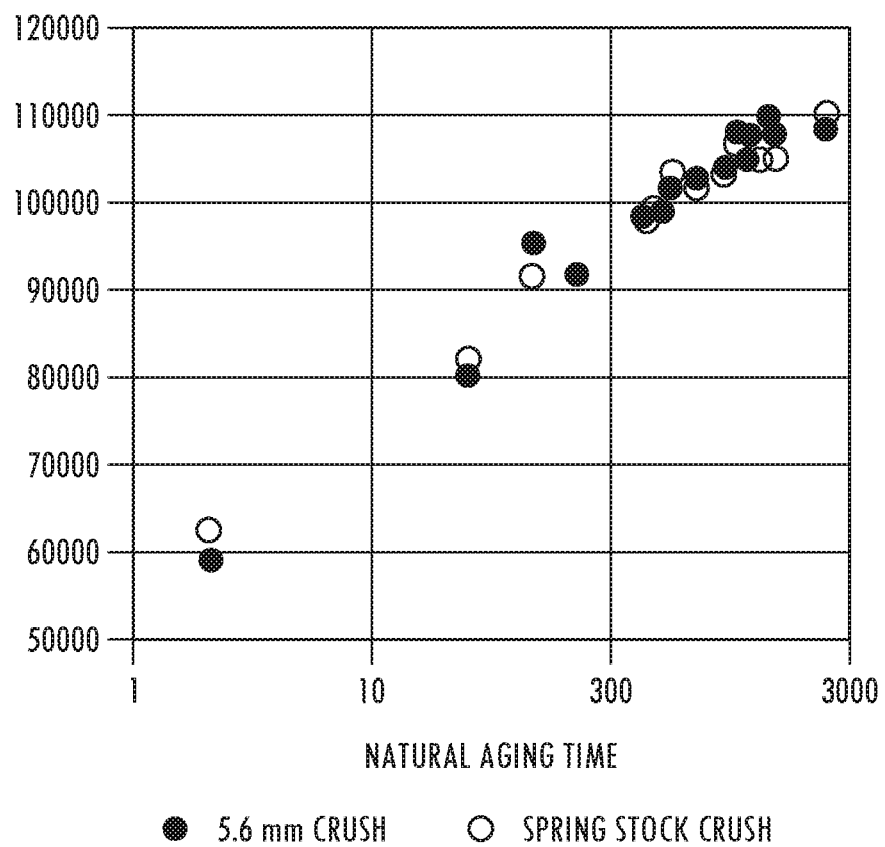
FIG. 15 is a chart showing a comparison of peak load during a crushing operation versus natural aging time of a hollow extruded aluminum beam.

With reference to the process shown in FIG. 13, one embodiment of the warm forming process or method is illustrated, where at step 66, the high strength aluminum beam is extruded with a hollow cross-sectional shape and where the extruded alloy comprises a 6000 series or a 7000 series aluminum alloy. At step 68, the process looks at whether the extruded beam needs or has a curvature along its length or otherwise whether the beam has any internal stresses, such as tension or compression as a result of a formed curvature, as such internal stress can jeopardize the potential for the beam to be subsequently formed. Accordingly, when there are generally no internal stresses or formed curvature along the length of the beam, such as when stretch bending is not necessary for the resulting component part, then at step 70 a portion of the die may be heated to a desired temperature and the subsequent step 72 merely requires that a portion of the aluminum beam is heated in the die to a temperature below the artificial aging temperature of the aluminum beam. Once this portion is heated, at step 74 the aluminum beam may be deformed to a desired shape with the die in a direction transverse to a length of the aluminum beam.

Still referring to FIG. 13, in cases where the desired resulting component has a curvature along its length and as result would have internal stresses in the beam, such as curvature may be formed at step 76, such as via stretch bending a curvature into the beam or sweeping a curvature into the beam. With the curvature and resulting internal stresses in the beam, at step 78 the portion of the die may be heated to a desired temperature and the subsequent step 80 preferably has the entire length of the aluminum beam, especially at the curvature, being heated in the die to a temperature below the artificial aging temperature of the aluminum beam. Once the beam is heated, at step 82 the aluminum beam may similarly be deformed to a desired shape with the die in a direction transverse to a length of the aluminum beam.

As a result of the warm forming, this deformation to the aluminum beam is generally done without causing cracking or other bending failure to the beam. Accordingly, the warm forming process of this method allows the extruded beam to be deformed to a desired shape outside of the time frame after extrusion or solutionizing that would typically cause the extruded beam to crack or otherwise fail as a result of such a deformation. Thus, a solutionizing process can be avoided while also improving manufacturing cycle time and inventory management of extruded pieces. With respect to the general method or formation steps discussed herein, they may be performed in various different sequences from those discussed to similarly result in forming the desired beam or portion thereof.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method for warm forming an aluminum beam, said method comprising:
   extruding an aluminum beam to an extruded length with a hollow cross-sectional shape, wherein the aluminum beam comprises a 7000 series aluminum alloy;
   after extruding the aluminum beam, naturally aging the aluminum beam at a temperature below 40 degrees Celsius for at least 24 hours prior to deforming the aluminum beam;
   after naturally aging the aluminum beam, placing the aluminum beam in a die without solutionizing the aluminum beam at any time after extrusion;
   heating a portion of the die;
   conductively heating a first portion of the aluminum beam with the heated portion of the die to a desired temperature below an artificial aging temperature of the aluminum beam, wherein the desired temperature is greater than 37 degrees Celsius and less than 150 degrees Celsius; and
   deforming the first portion of the aluminum beam from an extruded shape to a desired shape with the die in a direction transverse to the extruded length of the aluminum beam, wherein the die deforms the aluminum beam in a transverse direction to reduce an enclosed area of the hollow cross-sectional shape at the first portion of the aluminum beam.

2. The method of claim 1, wherein the first portion comprises an end section of the aluminum beam.

3. The method of claim 1, wherein the artificial aging temperature of the aluminum beam is greater than 150 degrees Celsius.

4. The method of claim 1, wherein a second portion of the aluminum beam is not deformed by the die.

5. The method of claim 1, wherein the aluminum beam is naturally aged at a temperature above 0 degrees Celsius.

6. The method of claim 1, wherein the hollow cross-sectional shape of the aluminum beam includes a leg that extends across the enclosed area of the aluminum beam and continuously along the extruded length of the aluminum beam.

7. The method of claim 6, wherein when the die deforms the hollow cross-sectional shape of the aluminum beam to reduce the enclosed area, the leg is deformed to a non-linear shape at the first portion of the aluminum beam.

8. The method of claim 1, wherein the aluminum beam comprises a curvature formed along a longitudinal section of the extruded length of the aluminum beam to define a convex outer wall, and wherein the first portion of the die forms the desired shape into the convex outer wall.

9. A method for warm forming an aluminum beam, said method comprising:
   providing an extruded aluminum beam that comprises a 7000 series aluminum alloy;
   naturally aging the extruded aluminum beam for at least 24 hours prior to deforming the extruded aluminum beam;
   after naturally aging the extruded aluminum beam, placing the extruded aluminum beam in a die without solutionizing the aluminum beam at any time after extrusion and prior to placement in the die;
   conductively heating a portion of the extruded aluminum beam with a heated portion of the die above a threshold temperature of 37 degrees Celsius and below 150 degrees Celsius; and
   deforming the heated portion of the extruded aluminum beam from an extruded shape to a desired shape with the die in a direction transverse to an extruded length of the extruded aluminum beam.

10. The method of claim 9, wherein the heated portion of the extruded aluminum beam does not exceed an artificial aging temperature of the extruded aluminum beam.

11. The method of claim 10, wherein the artificial aging temperature is greater than 150 degrees Celsius.

12. The method of claim 9, wherein the extruded aluminum beam comprises a cross-sectional shape taken transverse to the extruded length of the extruded aluminum beam that has an enclosed interior area extending along the extruded length of the tubular beam.

13. The method of claim 9, wherein the extruded aluminum beam comprises a curvature formed along a longitudinal section of the extruded length of the aluminum beam to define a convex outer wall, and wherein, upon heating the die and the longitudinal section of the aluminum beam, a depression is formed into the convex outer wall with the die.

14. The method of claim 9, wherein the natural aging of the extruded aluminum beam is at room temperature for at least 24 hours prior to deforming the desired shape into the extruded aluminum beam.

15. The method of claim 12, wherein the cross-sectional shape includes a leg extending across a hollow area of the extruded aluminum beam and continuously along the extruded length of the extruded aluminum beam.

16. The method of claim 15, wherein the leg is deformed to a non-linear shape as a result of deforming the heated portion of the aluminum beam with the die.

* * * * *

UNITED STATES PATENT AND TRADEMARK OFFICE
CERTIFICATE OF CORRECTION

PATENT NO. : 10,835,942 B2
APPLICATION NO. : 15/686837
DATED : November 17, 2020
INVENTOR(S) : Helen Weykamp et al.

Page 1 of 1

It is certified that error appears in the above-identified patent and that said Letters Patent is hereby corrected as shown below:

In the Claims

Column 11, Claim 9, Line 27, delete "I 50" and insert -- 150 --.

Signed and Sealed this
Fifth Day of January, 2021

Andrei Iancu
*Director of the United States Patent and Trademark Office*